US007788483B1

(12) United States Patent
Falik et al.

(10) Patent No.: US 7,788,483 B1
(45) Date of Patent: Aug. 31, 2010

(54) METHOD AND APPARATUS OF IDENTIFYING AND ENABLING OF FUNCTIONS OF A TRUSTED PLATFORM MODULE DEVICE

(75) Inventors: Ohad Falik, Kfar Saba (IL); Dan Morav, Herzelia (IL)

(73) Assignee: Winbond Electronics Corporation, Hsinchu (TW)

( * ) Notice: Subject to any disclaimer, the term of this patent is extended or adjusted under 35 U.S.C. 154(b) by 1084 days.

(21) Appl. No.: 11/124,917

(22) Filed: May 9, 2005

Related U.S. Application Data

(60) Provisional application No. 60/621,344, filed on Oct. 22, 2004.

(51) Int. Cl.
*H04L 29/06* (2006.01)
(52) U.S. Cl. ........................................ 713/155; 713/161
(58) Field of Classification Search ........................ None
See application file for complete search history.

(56) References Cited

U.S. PATENT DOCUMENTS

| | | | | |
|---|---|---|---|---|
| 4,759,063 A * | 7/1988 | Chaum | ........................ | 380/30 |
| 4,953,209 A * | 8/1990 | Ryder et al. | ................... | 705/59 |
| 5,400,403 A * | 3/1995 | Fahn et al. | ..................... | 705/51 |
| 5,796,833 A * | 8/1998 | Chen et al. | ................... | 713/156 |
| 5,995,625 A * | 11/1999 | Sudia et al. | .................... | 705/51 |
| 7,080,251 B2 * | 7/2006 | Fujishiro et al. | ............ | 713/171 |
| 2003/0086571 A1 | 5/2003 | Audebert et al. | | |
| 2003/0154387 A1 | 8/2003 | Evans et al. | | |
| 2003/0177353 A1* | 9/2003 | Hiltgen | ........................ | 713/161 |
| 2003/0188175 A1* | 10/2003 | Volk et al. | .................... | 713/191 |
| 2005/0157881 A1* | 7/2005 | Van Someren | .............. | 380/286 |

* cited by examiner

*Primary Examiner*—Kambiz Zand
*Assistant Examiner*—Dant B Shaifer Harriman

(57) ABSTRACT

A method is disclosed for a certifying authority (CA) to establish a secure status and authenticity in an integrated circuit (IC). Cryptographic logic and certification logic are incorporated in the IC by an IC manufacturer. The cryptographic logic is operable to generate a cryptographic key intended to be communicated external to the IC. The certification logic includes a certification key intended for use in establishing a secure certification arrangement. The certification key is communicated securely to the CA and a secure certification arrangement is established between the CA and the IC using the certification key. During the secure certification arrangement, the cryptographic key is accessed by the CA to certify the cryptographic key associated with the IC and in response thereto the certification key is deleted and the secured certification arrangement is terminated.

20 Claims, 3 Drawing Sheets

US 7,788,483 B1

METHOD AND APPARATUS OF IDENTIFYING AND ENABLING OF FUNCTIONS OF A TRUSTED PLATFORM MODULE DEVICE

This application claims the priority under 35 U.S.C. §119 (e) of U.S. Provisional Application No. 60/621,344, filed on Oct. 22, 2004 and incorporated herein by reference.

TECHNICAL FIELD OF THE INVENTION

This invention relates to a method and apparatus for identifying and enabling of functions of an Integrated Circuit (IC) device and of a Certification or Enabling entity.

BACKGROUND OF THE INVENTION

United States Patent Application Publication No. 2003/0086571 discloses a data processing method and system for generating a unique symmetric key inside a personal security device (PSD) having limited trust relationships between a PSD manufacturer, a PSD issuer, subsequent service providers and a trusted third party.

United States Patent Application Publication No. 2003/0154387 discloses a system, method, and article of manufacture for accurately tracking transactions involving software. First, a plurality of decryption keys is provided each of which allows use of corresponding software. Next, a request is received for a decryption key from a requestor after which a transaction represented by the request for the decryption key is logged. The decryption key is then outputted to the requester. Thereafter, the transaction is reported for allowing the tracking of revenue generated by the sale of the software.

There is a need in the art to provide for a new technique identifying and enabling of functions of an Integrated Circuit (IC) device and of a Certification or Enabling entity.

BRIEF DESCRIPTION OF THE DRAWINGS

In order to understand the invention and to see how it may be carried out in practice, an advantageous embodiment will now be described, by way of non-limiting example only, with reference to the accompanying drawings, in which like reference numerals represent like parts, and in which.

DETAILED DESCRIPTION OF THE INVENTION

Figure 1:
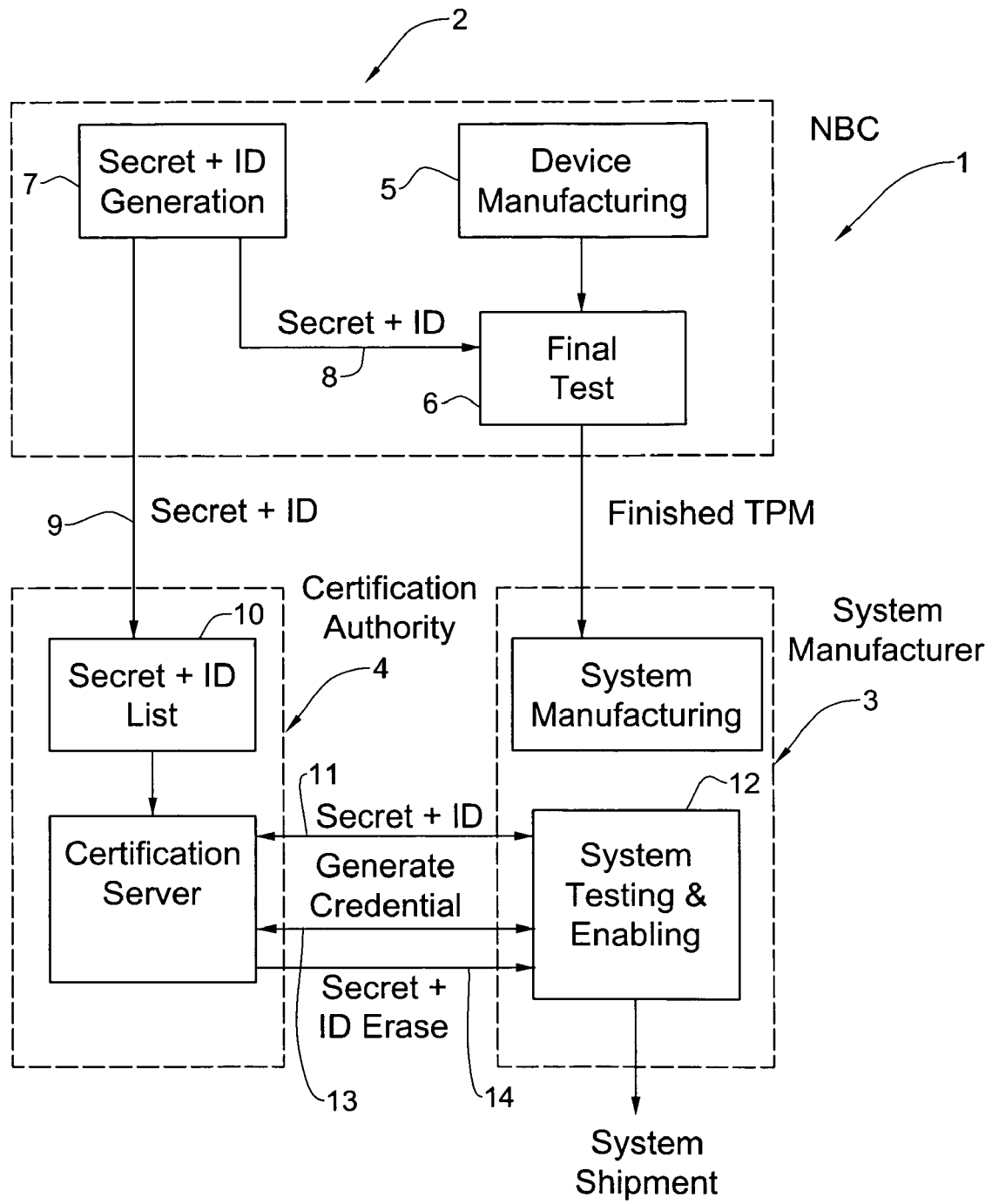
FIG. 1 is a general system architecture, in accordance with an advantageous embodiment of the invention.
Figure 2:
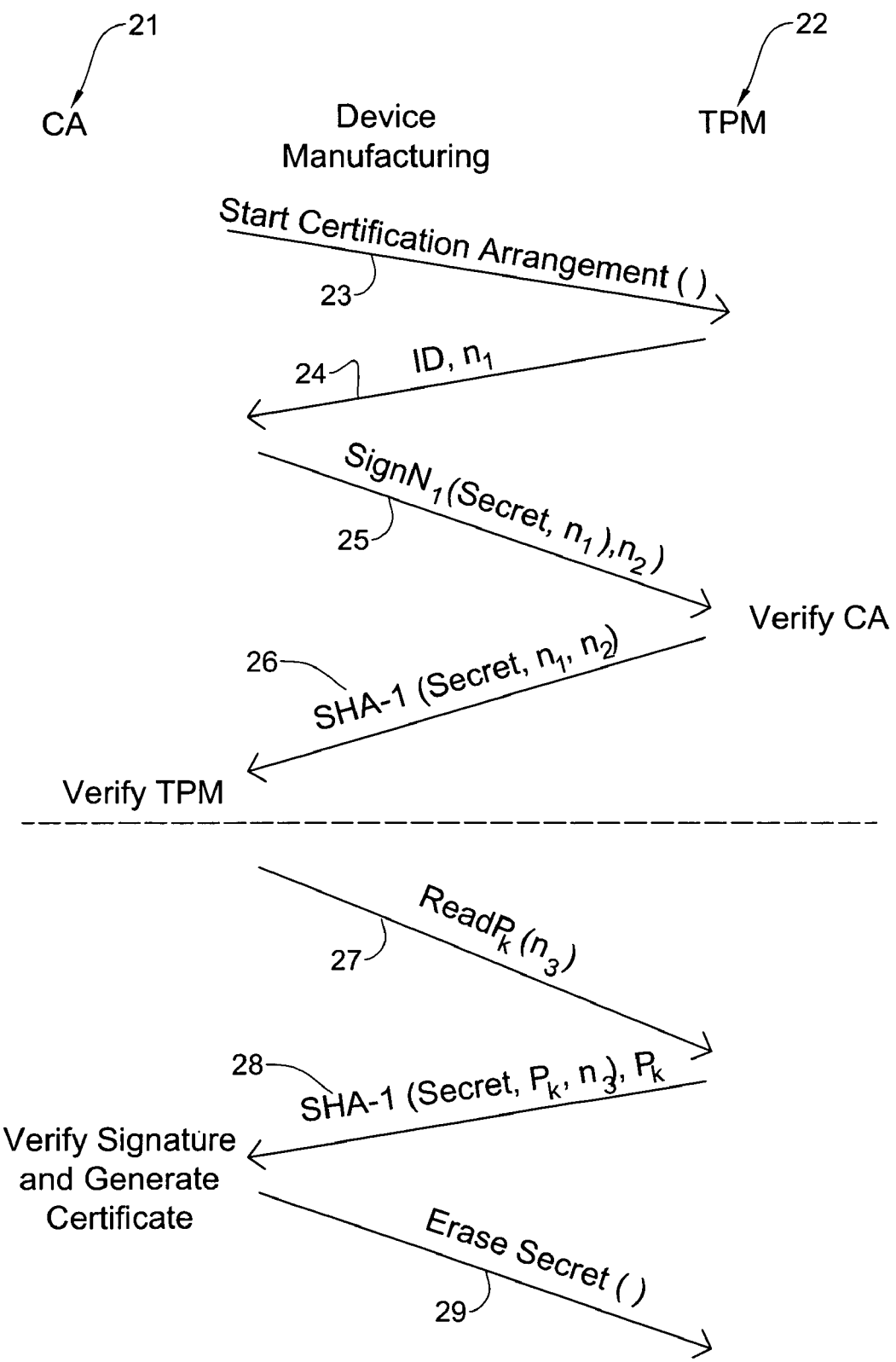
FIG. 2 illustrates a typical sequence of operation, in accordance with an advantageous embodiment of the invention.
Figure 3:
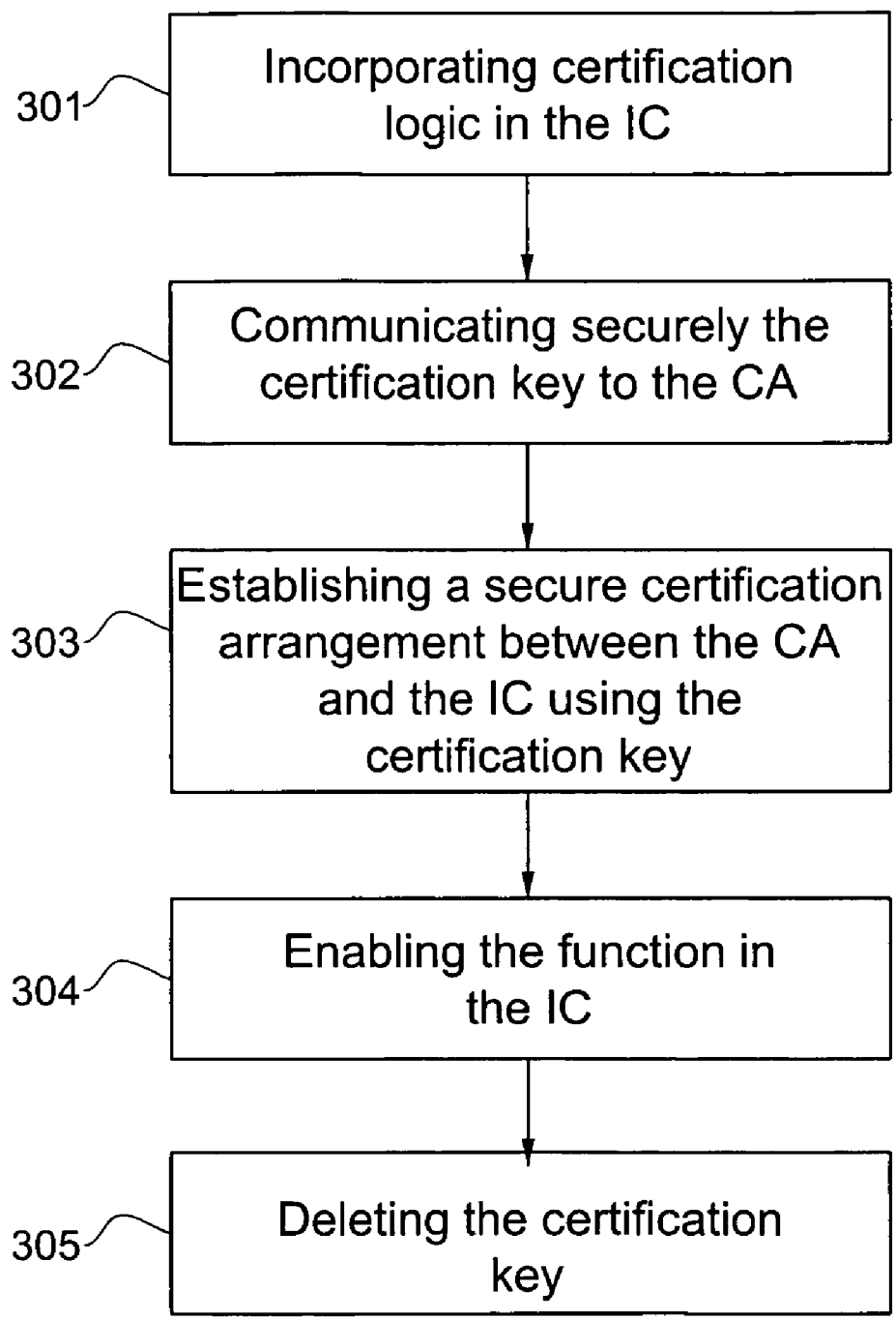
FIG. 3 illustrates a typical sequence of operation, in accordance with another advantageous embodiment of the invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged integrated circuit (IC) device.

To address the above-discussed deficiencies of the prior art, the invention thus provides for an integrated circuit (IC) manufactured by an IC manufacturer, a method of establishing a secure status and authenticity of the IC by a certification authority (CA), comprising, incorporating cryptographic logic in the IC by the IC manufacturer, the cryptographic logic being operable to generate a cryptographic key intended to be communicated external to the IC;

incorporating certification logic in the IC by the IC manufacturer, the certification logic including a certification key intended for use in establishing a secure certification arrangement;

communicating securely the certification key to the certification authority (CA);

establishing a secure certification arrangement between the CA and the IC using the certification key;

during the secure certification arrangement, accessing the cryptographic key by the CA for the purpose of certifying the cryptographic key associated with the IC and in response thereto erasing the certification key, to thereby terminate the secured certification arrangement.

In accordance with one advantageous embodiment it is further provided that after termination of the secured certification arrangement, a secure communication arrangement with the IC is established using the cryptographic key.

In accordance with the embodiment it is further provided that the cryptographic key includes a Public/Private Key pair, with the Public Key being intended for external communication.

In accordance with the embodiment it is further provided that the secure status includes a secure credential for the public key.

In accordance with the embodiment it is further provided that the cryptographic key includes an endorsement key.

In accordance with the embodiment it is further provided that the certification key includes an IC identification and a secret.

In accordance with the embodiment it is further provided that the certification key is communicated to the CA by the IC manufacturer.

In accordance with the embodiment it is further provided that the IC is a Trusted Platform Module (TPM).

In accordance with the embodiment it is further provided to protect against a brute force attack on the IC to reveal the certification key.

In accordance with the embodiment it is further provided to protect against Denial of Service (DOS) attacks.

In accordance with the embodiment it is further provided to invoke at least one action in the case of misuse of the secured certification arrangement.

In accordance with the embodiment it is further provided that the action is active.

In accordance with the embodiment it is further provided that the action is passive.

In accordance with the embodiment it is further provided to secure user privacy by avoiding transmission of plain cryptographic key during the secured certification arrangement.

In accordance with the embodiment it is further provided at least one additional certification key.

In accordance with the embodiment it is further provided that at least two of the certification keys have respective secrets and common IC identification.

In accordance with the embodiment it is further provided that at least one of the certification keys serve for enabling a function.

In accordance with the embodiment it is further provided that erasing of the secret is explicit.

In accordance with the embodiment it is further provided that erasing of the secret is implicit.

The invention further provides for an integrated circuit (IC) manufactured by an IC manufacturer, a method of establishing a secure status and authenticity of the IC by a certification authority (CA), comprising, incorporating cryptographic logic in the IC by the IC manufacturer, the cryptographic logic being operable to generate a cryptographic key intended to be communicated external to the IC;

incorporating certification logic in the IC by the IC manufacturer, the certification logic including a certification key intended for use in establishing a secure certification arrangement. The certification logic is configured, in response to an erasing of the certification key, to terminate the secure certification arrangement.

The invention still further provides for an integrated circuit (IC) manufactured by an IC manufacturer, a method of enabling a function in the IC by a certification authority (CA), comprising, incorporating certification logic in the IC by the IC manufacturer, the certification logic including a certification key intended for use in establishing a secure certification arrangement;

communicating securely the certification key to the certification authority (CA);

establishing a secure certification arrangement between the CA and the IC using the certification key;

during the secure certification arrangement, enabling the function in the IC and in response thereto erasing the certification key, to thereby terminate the secured certification arrangement.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "apparatus" and "controller" may be used interchangeably and mean any device, system or part thereof that controls at least one operation, such a device may be implemented in hardware, firmware or software, or some combination of at least two of the same. It should be noted that the functionality associated with any particular apparatus or controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Turning first to FIG. 1, there is shown a general system architecture 1, in accordance with an advantageous embodiment of the invention. In this embodiment, the system involves three parties. They are the Integrated Circuit (IC) manufacturer 2, e.g., National Semiconductor Corporation, manufacturing an IC (e.g., PC8374T or PC8392T), a system manufacturer 3 (e.g., a Personal Computer manufacturer) and a certification authority (CA) 4.

In many operational scenarios, it is required to provide a secure status of the IC (normally by a third trusted party) in order to authenticate certain characteristics of the chip (such as to assure its authenticity). For instance, in a computer system that accommodates a chip such as the specified PC8374T it is required to secure the status of the IC. A typical, yet not exclusive, example is an IC that accommodates a so-called Trusted Platform Module (TPM). The IC status will be exemplified in respect of the specific example of TPM. In this particular example, the status of the IC would be to provide a credential that attests that a public key is associated to a private key (both being an example of a cryptographic key) stored in an authenticated TPM, i.e., in a TPM that was manufactured by a given IC manufacturer (say, National Semiconductor Corporation). Those versed in the art will readily appreciate that the invention is by no means bound by this example. Note also that while the description below refers to the specific example of public/private keys as cryptographic keys, the invention is not bound by this example.

Reverting now to the Trusted Platform Module (TPM), the TPM can store measurements of components of the user's system. As is well known, the TPM provides the storage and reporting of the measurements of components of the user's system that are reported to it (see, e.g., https://www.trustedcomputinggroup.org/downloads/TCG_1_0_Architecure-_Overview.pdf, https://www.trustedcomputinggroup.org/downloads/TCG_Glossary.pdf), As is also known, many applications require communicating or using an authenticated TPM (i.e., a TPM that was manufactured by a designated IC manufacturer). This may be achieved, for instance, by certifying a public key that is associated with a private key stored in the authenticated TPM.

In accordance with a certain approach of the prior art, a possible approach to obtain secured public/private pair of keys is to incorporate in the TPM a cryptographic logic that is capable of generating a pair of public/private keys and store safely this pair in the TPM (with the public key available to the external world). In accordance with this approach, the incorporation of the cryptographic logic and the generation of the public/private pair occur during the manufacturing phase of the IC at the chip's manufacturing premises. Note that the generation and incorporation of a cryptographic key into each IC (at the IC manufacturer end) normally extends for a relatively long period on the order of minutes per chip which is very costly (and therefore commercially infeasible) bearing in mind the very high manufacturing costs of each chip in the fabrication facility (FAB). Note, however, that by this example the IC manufacturer has no knowledge whatsoever of the private key since the latter is generated internally in the TPM (by the cryptographic logic) and is stored in a secured fashion in the TPM. This lack of knowledge constitutes an advantage insofar as possible liability of the chip manufacturer, as will be discussed in greater detail below.

Turning now to another approach in accordance with the prior art, this approach generates at the IC manufacturer end a repertoire of cryptographic keys off-line (i.e., a pair of private/public keys) and injects them into the TPM (at the IC manufacturer end). This approach has an advantage over the alternative described above (i.e., the incorporation of cryptographic logic which will generate the public/private pair at the IC manufacturer end), since due to the off-line generation of the keys, the whole process of incorporating the (already available) private/public pair in the TPM is considerably shorter and therefore precious fabrication (FAB) time is saved per chip, giving rise to significant reduction of costs. However, this approach has some other significant shortcomings. Thus, since the public/private keys are generated externally to the TPM, the IC manufacturer must have a controlled and protected environment for generating and injecting the keys. In particular, the risk in this approach is that safety is jeopardized in the sense that a third, unauthorized party, may procure the private key from the controlled environment at the IC manufacturer end, and improperly use it. In addition, privacy may be jeopardized since a third, unauthorized party, may procure (from the controlled environment) data indicative of public keys. This would enable, for instance, the third party to track the operations of the "machine" (based on the public key), e.g., monitoring Internet surfing and transactions conducted using the public key), thereby jeopardizing the privacy of the user who uses the machine.

The net effect would be that due to the safety and privacy problems, the IC manufacturer may potentially be held legally liable in connection with damages that occur due to (later) improper use of the cryptographic key, e.g., in acts of fraud in monetary transactions. This liability may apply even if the manufacturer is not directly or indirectly involved in the improper use.

A modified approach to the first method would be to generate the cryptographic key at the system manufacturer premises in the IC (e.g., TPM using incorporated cryptographic logic) during the system set up time. The advantage is that substantially no overhead is imposed in the manufacturing process at the IC manufacturing end, because the cryptographic keys are generated at the system manufacturing end. Note incidentally, that insofar as the system manufacturer is concerned, the time required to incorporate the so received cryptographic key does not impose overhead, because, anyhow, there is a time interval that is allocated for system setup time (of the manufactured system). During this setup time the cryptographic key can be generated in the TPM with almost no time overhead.

Bearing in mind all these shortcomings of the prior art solutions, in accordance with certain advantageous embodiments of the invention, there is provided a mechanism, which guarantees that the chip manufacturer has no knowledge of the details of the cryptographic key and therefore cannot be held liable due to an improper use of the key. In addition, the undue overhead of incorporating the cryptographic key in the IC (say the TPM), while consuming expensive system manufacturing or fabrication (FAB) process time is obviated.

Therefore, attention is again drawn to FIG. 1. In accordance with this advantageous embodiment of the invention the IC manufacturer 2, performs the device manufacturing step 5 and during the final test phase 6 a cryptographic logic is incorporated into the IC (e.g., TPM). The cryptographic logic is operable to generate a cryptographic key (e.g., private/public pair of keys), of which (only) the public key is intended to be communicated external to the IC as part of, inter alia, establishing a secure certification arrangement with the certification authority (CA) 4. In addition, a certification logic is incorporated into the IC (e.g., TPM). The certification logic includes a certification key (e.g., a secret) intended for use in establishing the secure certification arrangement. As shown in FIG. 1, the certification key (being in this example a secret of, say, one hundred sixty (160) bits long and an associated identification—say, an eight (8) byte identification (ID) code) is generated 7 and incorporated 8 in the chip. The secret can be generated in a known per se manner, e.g., by using a random or pseudo-random generator based algorithm.

The use of the secret for establishing the secure certification arrangement will be explained in greater detail below. Note that the certification key is also communicated 9 to the certification authority (CA) 4 in a secured fashion (e.g., through an SSL secured link or via secure transfer of physical media) and the secret is stored in the safe Secret +ID List module 10 of the certification authority (CA) 4.

The net effect is, thus, that the certification key (e.g., secret) is incorporated into the chip (say, the TPM) and is also communicated to the certification authority (CA) 4. It should be noted that unlike the cryptographic key, the incorporation of the certification key in the IC poses considerably less overhead than the incorporation of the cryptographic key since it may require, for instance, generating a random number (that requires considerably less computational resources compared to the generation of an RSA private-public pair).

Now, the system manufacturer 3 (say, the Personal Computer (PC) manufacturer) needs to obtain a secure status for the IC and to this end it is required to obtain the appropriate credentials from the CA, all as known per se. Accordingly, a secure certification arrangement is established 11 between the CA and the IC (fitted in the System Testing and Enabling module 12) using the secret, all as will be described in greater detail below. The secure certification arrangement allows the assurance (from the TPM side) that the CA is indeed a trusted party and from the CA side that the IC used in the system is genuine.

Within the secured certification arrangement, the CA would be able to certify the cryptographic key (and to this end provide credentials 13), and thereafter the secret can be deleted 14 leaving no trace insofar as the system manufacturer 3 is concerned. This also terminates the secured certification arrangement. In other words, in this advantageous embodiment, the IC manufacturer is not aware of the cryptographic key (because the latter is generated by the cryptographic logic during system testing at the system manufacturer end) and consequently the privacy/safety problems that arose in the prior art method (due to the need to construct and protect, at the IC manufacturer end, safe environment for storing the private/public pairs), are not encountered. Consequently, the IC manufacturer cannot be held liable in connection with the misuse of the public/private keys. In addition, there is no possibility to re-play the secure certification arrangement procedure (e.g., for fraud usage), because the secret is deleted (in a secured fashion using the certification logic), e.g., as soon as possible before the first use of the IC (e.g., the enabling of the TPM). If desired, additional measures can be taken to reinforce the safety of the secured certification arrangement. Thus, by way of a non-limiting example, the CA can mark any used secret and consequently readily identify an attempt to re-use the secret. Now, having terminated the secured certification arrangement, the (certified) public key can be used for establishing secure communication between the system (incorporating the so authorized TPM) and external devices/applications, all as known per se.

Note that the invention is not bound by the specific architecture and sequence of operation described with reference to FIG. 1.

Attention is now directed to FIG. 2. FIG. 2 illustrates a sequence of operation in accordance with an advantageous embodiment of the invention. Initially there will be described the secure certification arrangement. Thus, at the onset, the certification authority (CA) 21 sends a request to start the certification arrangement over a communication link 23 to the Trusted Platform Module (TPM) 22 at the system manufacturer. As may be recalled, the chip ID is stored in module 10 at the CA end (see. FIG. 1) and was sent to the CA, through a secured link, by the manufacturer of the chip.

Reverting now to FIG. 2, the TPM 22 responds by transmitting over the communication link 24, the ID along with an arbitrary random value $n_1$. The CA would now sign $n_1$ using the secret, e.g., while using a known per se SHA-1 hash function and will add an arbitrary random value $n_2$. The resulting value will be sent over the communication link 25 to the TPM 22. The TPM 22 is now in a position to verify the authenticity of the CA by verifying the signature on $n_1$ with the secret, by applying the SHA-1 function on the secret and $n_1$ (both known to TPM 22). If the value received over the communication channel (in 25) is identical to SHA-1(secret, $n_1$), then the TPM 22 verifies the authenticity of the CA 21. The reason is that no one (other than the CA 21, and the IC manufacturer) knows the secret and it is practically infeasible to decode the secret from the transmitted SHA-1(secret, $n_1$) value, since the SHA-1 function is a one-way function. The role of $n_1$ is to avoid re-play on TPM 22. Thus, if an eavesdropper intercepts the communication SHA-1(secret, $n_1$), the eavesdropper cannot decode the secret, and therefore, the only available option is to re-transmit the entire sequence SHA-1(secret, $n_1$). This, however, is readily detected by the TPM 22 as re-play (because each sequence is using a random number $n_i$ which is changed every transaction randomly) and therefore is ignored. In accordance with certain embodiments additional counter-measures can be taken, e.g., for protecting against a brute force attack on the IC to reveal the secret. Such countermeasure means can include, for example, counting the number of wrong tries per ID, or in accordance with another embodiment allowing a limited number of tries per time interval.

Having authenticated the CA 21, the TPM 22 would now sign on the secret, $n_1$ and $n_2$ the using the SHA-1 hash. The resulting value will be sent over the communication link 26 to the CA 21. The CA 21 is now in a position to verify the authenticity of the TPM 22 by applying the SHA-1 function on the secret $n_1$ and $n_2$ (both known to the CA 21). If the value received over the communication channel 26 is identical to SHA-1(secret, $n_1$, $n_2$), then the CA 21 verifies the authenticity of the TPM 22. The role of $n_2$ is to avoid re-play on CA 21. Thus, if an eavesdropper intercepts the communication SHA-1(secret, $n_1$, $n_2$), the eavesdropper cannot decode the secret, and therefore, the only available option is to re-transmit the entire sequence SHA-1(secret, $n_1$, $n_2$). This, however, is readily detected by the CA 21 as re-play (since each sequence is using a random number which is changed every transaction statistically) and therefore is ignored.

All the processing operations performed at the TPM end (e.g., as described in FIG. 2) are performed in the certification logic. The invention is not bound by any specific manner of realizing the certification logic, and a fortiori not by the use of the SHA-1 function, and accordingly in accordance with certain embodiments other secured one-way hash functions or signing schemes may be applied.

Now, both the CA 21 and the TPM 22 are identified and authenticated.

Next, the CA 21 would be able to certify the cryptographic key by providing the required credentials 13.

Accordingly, in this advantageous embodiment, CA 21 needs to read the public key 27 and provides an arbitrary random value, $n_3$. Then TPM 22, using the cryptographic logic, extracts the public key $P_k$ (of the private/public pair), calculates SHA-1(secret, $P_k$, $n_3$) and transmits it over the communication link 28. The signed secret serves for identifying that its source is the TPM 22, the signed $P_k$ verifies that the $P_k$ sent open over the communication link 28 is indeed the one for use and $n_3$ serves for avoiding re-play similar to the role of $n_1$ and $n_2$, discussed above.

Having authenticated the public key an appropriate credential can be provided (in a known, per se manner), and the secret, the role of the secret is terminated and it can be erased (by the certificate logic) in response to an appropriate command transmitted by the CA 21 on communication link 29. Note that certain Denial of Service (DOS) attacks can be performed, e.g., by submitting a false "erase secret" command (say, from an un-trusted party, other than the CA 21) before or during the use of the secret, thereby preventing successful termination of the secured certification arrangement. In accordance with certain embodiments of the invention there are provided means for hindering Denial of Service (DOS) attacks. Thus, by way of a non-limiting example, the step of transmitting a signal over communication link 28 (in FIG. 2) can be modified to send "SHA-1(Secret, Pk, $n_3$), Pk, $n_4$" (namely by adding a randomly selected value $n_4$) and the step of transmitting a signal over communication link 29 can be modified to send a signal "EraseSecret(SHA-1(Secret, $n_4$))". The secret will then be erased (in the TPM 22) only if the communication received on communication link 29 includes data that is identical to the SHA-1(Secret, $n_4$) which indicates that the Erase secret command originated from the CA 21 (and therefore is a trusted "erase secret" command).

Note that in accordance with certain embodiments of the invention yet additional measures are provided to secure the erasure of the secret before the first use of the TPM 22, irrespective of whether an "erase secret" command has been received or not.

Those skilled in the art will readily appreciate that the invention is not bound by the specific use of the erase command as described above.

Now when the public key $P_k$ is approved as one originating from an authenticated TPM, the pair of private/public keys can serve in a secure communication arrangement with external application/devices, all as known, per se. For example, in case that the cryptographic key is the Endorsement Key (EK) defined in the TCG, the EK is used to recognize a genuine TPM. The EK is used to decrypt information sent to a TPM in the Privacy CA and DAA protocols, and during the installation of an Owner in the TPM. The credential proves the authenticity of the EK.

Note that by this embodiment, the secret provided by the IC manufacturer serves for the sole purpose of mutually authenticating the CA and the TPM in a secure certification arrangement. The cryptographic key is generated independently by the cryptographic logic, with no intervention of the IC manufacturer. For instance, in the case that the cryptographic key is constituted by a private/public key pair, the IC manufacturer cannot procure the private key and will not be held liable for any (later) fraudulent use of the cryptographic key.

Note that the invention is not bound by the use of the specific scenario illustrated in FIG. 2, neither by any specific signing scheme. For instance, by another embodiment the sequence of transmitting on communication links 25 and 26 can be omitted. By this modified embodiment, the CA 21 can check at first that the secret and the $P_k$ received on communication link are correct by comparing the data received over the communication link 28 to the value of SHA-1 (secret, $P_k$, $n_3$), and in case of identity, both the authenticity of the TPM 22 is achieved (owing to the "approved" secret) as well as the authenticity of the public key $P_k$ (owing to the "approved" $P_k$).

Note that in accordance with certain embodiments of the invention in the case that a secured certification arrangement is not terminated successfully or other misuse of the secured certification arrangement (e.g., an attempt to re-use an ID of a TPM which (ID) already formed part of a successful secured certification arrangement in the past), predefined action(s) can be taken. Thus, in accordance with certain embodiments appropriate (passive) indication is invoked, say, transmission of email, (SMS or other) message to a designated trusted party (e.g., the CA), indicating, say, that few false tries have been encountered (e.g., receipt of transmissions that do not match the secret). In accordance with certain other embodiments active measures can be taken, e.g., immediate termination of the certification process, or a known per se revocation of already issued credentials. Whether to apply passive and/or active actions and under what conditions can be determined, depending upon the particular application.

In yet another advantageous embodiment, the secret is not identified explicitly, but rather by an index reference to a table storing secret data. The table is stored in the TPM. In one advantageous embodiment, the secrets are stored in the table according to their designation, for instance index #1 identifying the first location in the table for secret designated for authenticating a chip, as discussed above with reference to FIGS. 1 and 2. Index #2 identifies the second location in the table for secret designated for enabling functions in the IC (such as an option in the TPM functionality or other optional functionality for use in a system, etc.)

Thus, in accordance with another advantageous embodiment (described with reference to FIG. 3), for an integrated circuit (IC) manufactured by an IC manufacturer, a method is provided for enabling a function in the IC by a certification authority (CA), comprising: incorporating certification logic in the IC (step 301) by the IC manufacturer, the certification logic including a certification key intended for use in establishing a secure certification arrangement. Next, communicating securely the certification key to the CA (step 302). Next, establishing a secure certification arrangement between the CA and the IC using the certification key (step 303). During the secure certification arrangement, enabling the function (step 304) in the IC and in response thereto deleting the certification key (step 305), before the first use of the IC, to thereby terminate the secured certification arrangement.

In accordance with certain embodiments, the role of the manufacturer described, e.g., in FIGS. 2 and 3, can be performed by a user. Thus, for example, a user who purchases a new Personal Computer (PC) will at the onset invoke a procedure of the kind described with reference to FIGS. 2 and 3 (where, module 3 of FIG. 1 and the role of the TPM 22 are operated at the user end, e.g., through the Internet).

In accordance with certain advantageous embodiments, the privacy of a user can be secured by avoiding transmission of a plain form of the public key (see, for example, in the transmission over communication link 28 in FIG. 2), but rather an encrypted form thereof (using known per se means), thereby assuring that the public key cannot be intercepted and used improperly to monitor user activities.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The present invention has been described with a certain degree of particularity, but those versed in the art will readily appreciate that various alterations and modifications may be carried out, without departing from the scope of the following claims. It is intended that the present invention encompass such changes and modifications as fall within the scope of the appended claims.

What is claimed is:

1. For an integrated circuit (IC) manufactured by an IC manufacturer,
   a method of establishing a secure status and authenticity of the IC by a certification authority (CA), said method comprising the steps of:
   (a) incorporating cryptographic logic in the IC by the IC manufacturer, the cryptographic logic being operable to generate a cryptographic key intended to be communicated external to the IC;
   (b) incorporating certification logic in the IC by the IC manufacturer, the certification logic comprising a certification key for use in securely transferring the cryptographic key from the IC to the CA thus establishing a secure certification arrangement;
   (c) communicating securely the certification key to the CA;
   (d) establishing a secure certification arrangement between the CA and the IC using the certification key; and
   (e) during the secure certification arrangement, accessing the cryptographic key by the CA for the purpose of certifying the cryptographic key associated with the IC and in response thereto erasing the certification key from the IC and from the CA, to thereby terminate the secured certification arrangement.

2. The method according to claim 1, wherein after termination of the secured certification arrangement, a secure communication arrangement with the IC is established using the cryptographic key.

3. The method according to claim 1, wherein the cryptographic key comprises a Public/Private Key pair, with the Public Key being intended for external communication.

4. The method according to claim 3, wherein said secure status comprises a secure credential for the public key.

5. The method according to claim 1, wherein the cryptographic key comprises an endorsement key.

6. The method according to claim 1, wherein the certification key comprises an integrated circuit (IC) identification and a secret.

7. The method according to claim 1, wherein the certification key is communicated to the CA by the IC manufacturer.

8. The method according to claim 1, wherein said IC comprises a Trusted Platform Module (TPM).

9. The method according to claim 1, further comprising the step of one of:
   protecting against at least one brute force attack on the IC to reveal the certification key and protecting against at least one Denial of Service (DOS) attack.

10. The method according to claim 1, further comprising the step of invoking at least one action in the case of misuse of the secured certification arrangement.

11. The method according to claim 10, wherein said action is one of: active and passive.

12. The method according to claim 1, further comprising the step of securing user privacy by avoiding transmission of a plain cryptographic key during the secured certification arrangement.

13. The method according to claim 1, further comprising the step of using at least one additional certification key.

14. The method according to claim 13, wherein at least two of said certification keys have respective secrets and common IC identification.

15. The method according to claim 13, wherein at least one of said certification keys serves for enabling a function.

16. The method according to claim 1, wherein at said erasing of said certification key is one of: explicit and implicit.

17. For an integrated circuit (IC) manufactured by an IC manufacturer,
    a method of establishing a secure status and authenticity of the IC by a certification authority (CA), said method comprising the steps of:
    (a) incorporating cryptographic logic in the IC by the IC manufacturer, the cryptographic logic being operable to generate a cryptographic key intended to be communicated external to the IC; and
    (b) incorporating certification logic in the IC by the IC manufacturer, the certification logic comprising a certification key for use in securely transferring the cryptographic key from the IC to the CA thus establishing a secure certification arrangement; the certification logic is configured, in response to an erasing of the certification key, to terminate the secure certification arrangement.

18. The method according to claim 17, wherein after termination of the secure certification arrangement, a secure communication arrangement with the IC is established using the cryptographic key.

19. The method according to claim 17, wherein the cryptographic key comprises a Public/Private Key pair, with the Public Key being intended for external communication.

20. For an integrated circuit (IC) manufactured by an IC manufacturer,
a method of enabling a function in the IC by a certification authority (CA), said method comprising the steps of:

(a) incorporating certification logic in the IC by the IC manufacturer, the certification logic comprising a certification key for use in securely transferring the cryptographic key from the IC to the CA thus establishing a secure certification arrangement;

(b) communicating securely the certification key to the CA;

(c) establishing a secure certification arrangement between the CA and the IC using the certification key; and (d) during the secure certification arrangement, enabling the function in the IC and in response thereto erasing the certification key, to thereby terminate the secured certification arrangement.

* * * * *